United States Patent [19]
Luo

[11] Patent Number: 5,411,379
[45] Date of Patent: May 2, 1995

[54] PNEUMATIC FAN

[76] Inventor: A-Fa Luo, No. 22, Shu-Yi 1 Lane. South Area, Taichung, Taiwan, Prov. of China

[21] Appl. No.: 104,982

[22] Filed: Aug. 10, 1993

[51] Int. Cl.$^6$ .............................................. F04B 9/08
[52] U.S. Cl. ..................................... 417/390; 417/406
[58] Field of Search ................... 417/390 O, 409, 390, 417/406; 416/247 R, 246 R; 415/202; 418/257

[56] References Cited

U.S. PATENT DOCUMENTS

| | | | |
|---|---|---|---|
| 1,442,467 | 1/1923 | Chernesky | 416/170 C |
| 3,167,023 | 1/1965 | Scognamillo | 418/257 |

Primary Examiner—Richard A. Bertsch
Assistant Examiner—Peter Korytnyk
Attorney, Agent, or Firm—W. Wayne Lianh

[57] ABSTRACT

A pneumatic fan containing a revolving wheel, which has a circumference, first and second stepped fillets at both axial ends thereof, and a rotary main shaft extending from the stepped fillets. The circumference is provided with a plurality of axially extending slots. The pneumatic fan further contains a plurality of impellers which are slidably received by the axially extending slots, each of the axially extending slots having a depth greater than the height of the impellers. Two shaft bearing seats are provided to receive the rotary main shaft at two axial ends thereof. The revolving wheel including the impellers are enclosed in a cylindrical motor seat having an entrance port for receiving air and an exit port for exiting air. The revolving wheel is disposed eccentrically relative to the motor seat, and the motor seat and the rotary main shaft have a point of contact, such that the entrance port and the exit port are disposed equidistantly from, and at opposite sides of, the point of contact. Two ring-shaped collars are provided to fit over the first and second stepped fillets, respectively. The first and second fillets are structured such that the collars are disposed eccentrically relative to the revolving wheel, and both collars are dimensioned such that the sum of its outside radius and the height of the impeller equal the radius of the motor seat.

2 Claims, 6 Drawing Sheets

PNEUMATIC FAN

FIELD OF THE INVENTION

The present invention relates generally to a fan, and more particularly to a fireproof and anti-knocking pneumatic fan, which is provided with means for changing the speed of air and the flowing direction of air in a stepless manner.

BACKGROUND OF THE INVENTION

The fan that is commonly used on the factory floor is generally operated by electricity to drive the motor, which in turn causes the fan blades to turn to generate the air current. The operation of such an electrical fan as described above can be adjusted only in a stepped manner and is limited in design in several respects, which are expounded upon explicitly hereinafter.

The conventional electric fan that is used on the factory floor is generally provided with a fan shield of metal material. Such a conventional electric fan can be a fire hazard because the metal shield of the fan can cause a spark at the time when the fan is accidentally thrown off balance to fall on the factory floor. Therefore, it is not safe to operate such electric fans in many areas, such as a natural gas factory, a chemical factory, a storage depot of paints containing the volatile chemical substances like toluene and acetone, an iron melting works, a humid basement, etc.

The conventional electric fan is not cost effective in view of the fact that it is not energy efficient. In addition, the application of the fan is limited in that it rotates unidirectionally and that it generates the air current in a stepped manner.

The conventional electric fan is often moved around on the factory floor, thereby causing the damage to the surface of the factory floor and to the electric cord attached to the fan. The structural damage of the electric cord can often bring about the leakage of electricity.

SUMMARY OF THE INVENTION

It is therefore the primary objective of the present invention to provide a pneumatic fan, which comprises a pneumatic motor driven by compressed air. The pneumatic motor has a revolving wheel mounted on a main shaft. The main shaft is provided respectively on both ends thereof with a stepped fillet. The revolving wheel is provided in the circumference thereof with a plurality of slots, each of which is of a proper depth to receive therein a motor impeller. The depth of the slot is slightly greater than the height of the motor impeller so as to permit the motor impeller to be inserted properly into the slot. The revolving wheel is further provided with an annular sleeve, which results in an increase in the outer diameter of the revolving wheel. The sum of the outer diameter of the revolving wheel and the combined height of the two motor impellers must be equal to the inner diameter of the motor seat. The collar has a thickness that is smaller than the depth of the stepped fillet of the revolving wheel. The collars are fitted into the stepped fillets located in both ends of the revolving wheel. Thereafter, the motor impellers are fitted into the slots of the revolving wheel. The rotary main shaft located at one end of the revolving wheel is forced into the shaft bearing seat so as to cause the collar to be locked in the stepped fillet. The motor seat is then mounted on the revolving wheel. The rotary main shaft located at another end of the revolving wheel is forced into the shaft bearing seat. When the revolving wheel is caused to rotate eccentrically, the motor impellers are caused to turn to the lowest point in view of the fact that the sum of the combined height of the two opposite motor impellers and the outer diameter of the collar is equal to the inner diameter of the motor seat, and that the collar and the revolving wheel rotate at the same speed. As a result of the eccentric rotation of the revolving wheel, one end of the motor impeller lodged in the slot urges the collar to move while the motor impeller urges the opposite motor impeller so as to make contact with the motor seat. Due to the movement of the collar, the other motor impeller is caused to extend out of or to move into the slot so as to cause the opposite motor impeller to make contact with the motor seat. The alternate motor impeller and the motor seat maintain a sealed space so that the pneumatic motor is capable of operating efficiently to drive the fan blades without the use of electricity. The pneumatic fan is further provided with an adjustable control device for regulating the speed of the air current and the operation of the pneumatic fan in a stepless manner.

It is another object of the present invention to provide a pneumatic fan with a silencer, which is mounted on one side of the pneumatic motor of the pneumatic fan for reducing the noise generated by the rotating fan blades to a minimum.

It is still another object of the present invention to provide a pneumatic fan with means capable of preventing the pneumatic motor from knocking to enhance the safety of the pneumatic fan. The pneumatic fan also has a means capable of collecting and transferring the exhaust air of the pneumatic fan to drive the pneumatic motor of another pneumatic fan.

The foregoing structures, objectives and functions of the present invention can be fully understood by studying the following detailed description of the present invention in conjunction with the accompanying drawings.

DETAILED DESCRIPTION OF THE INVENTION

Figure 1:
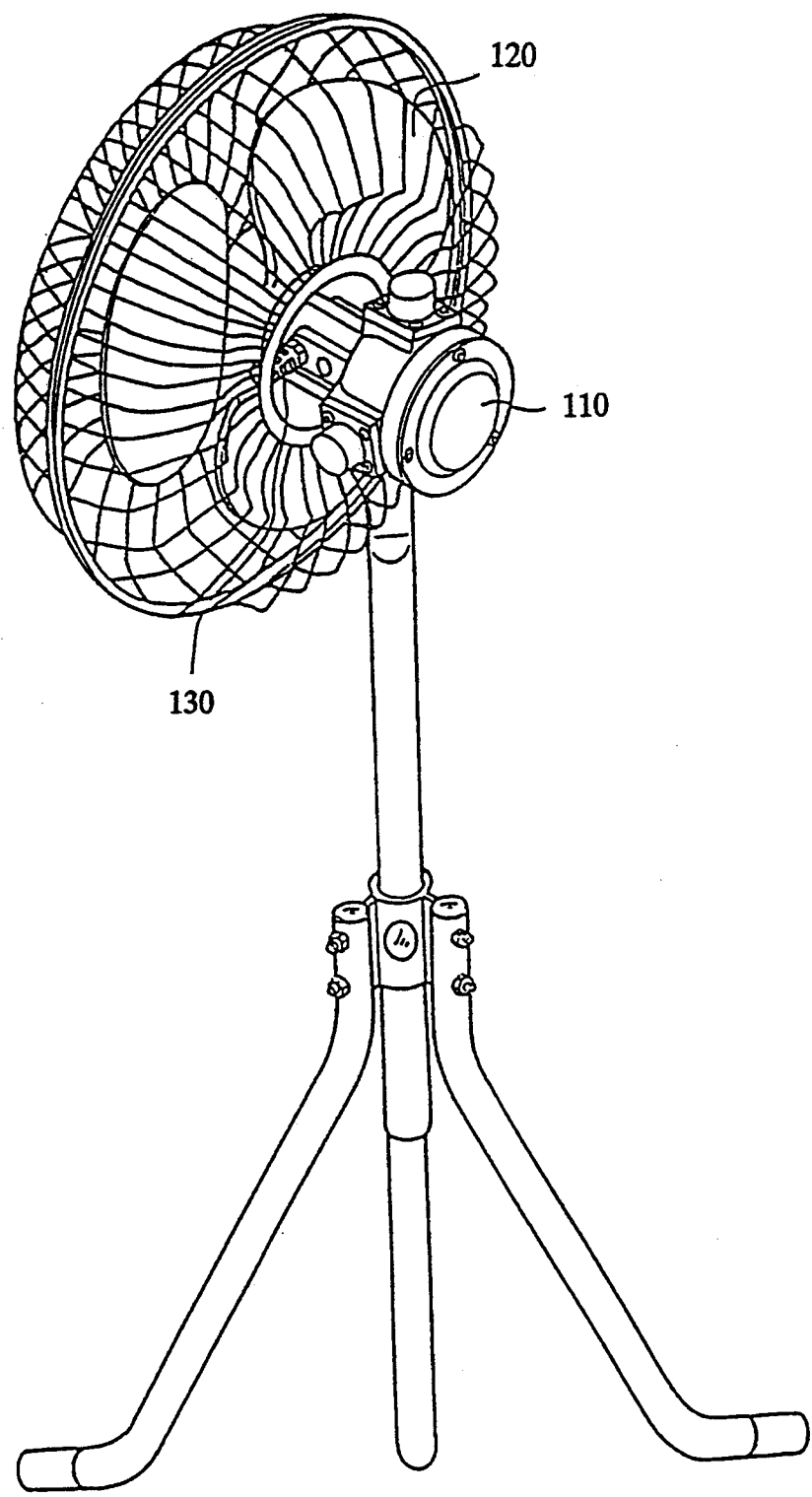
FIG. 1 shows a perspective view of a pneumatic fan embodied in the present invention.
Figure 4:
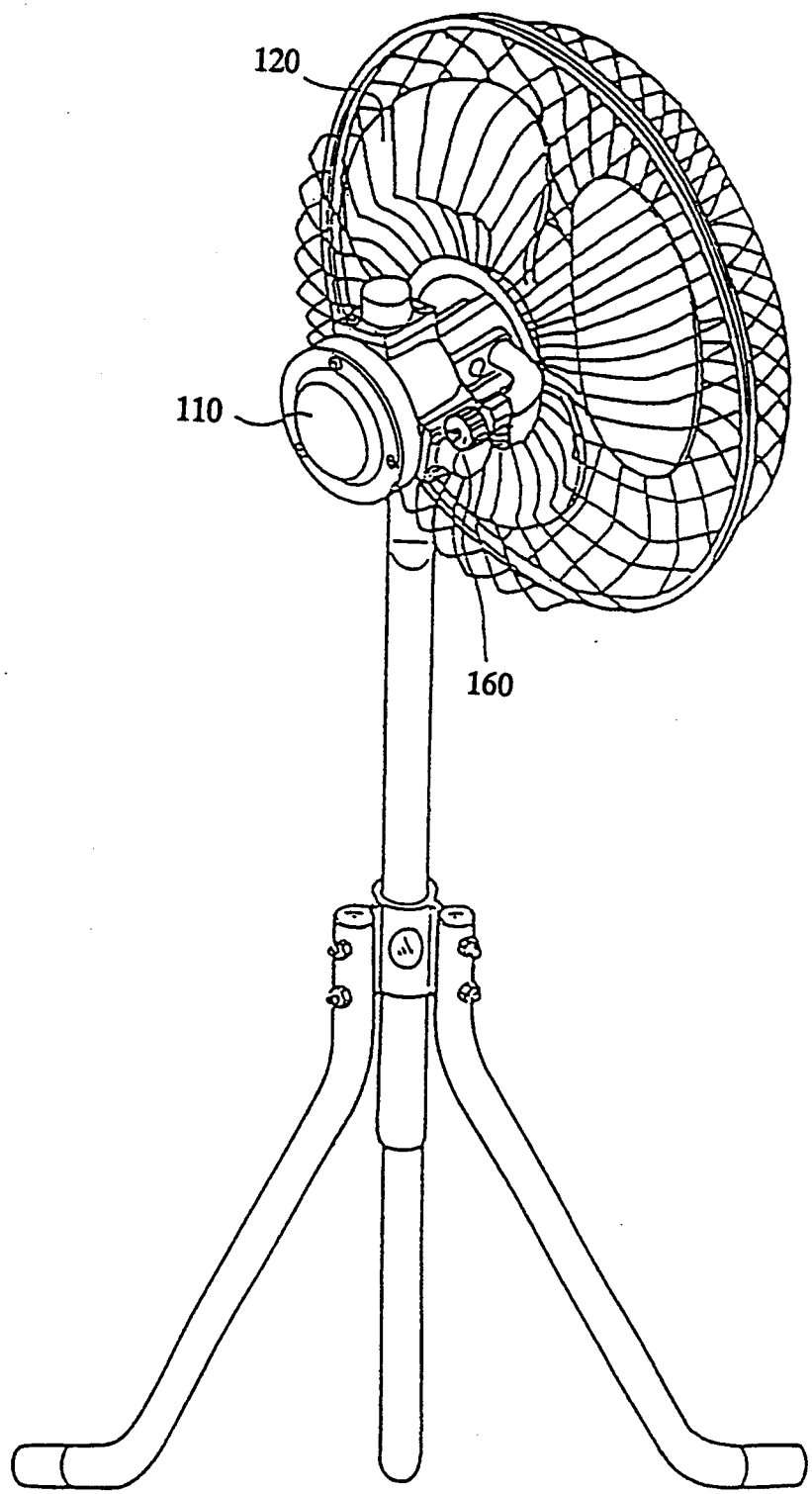
FIG. 4 shows a side perspective view of the pneumatic fan of the present invention.
Figure 5:
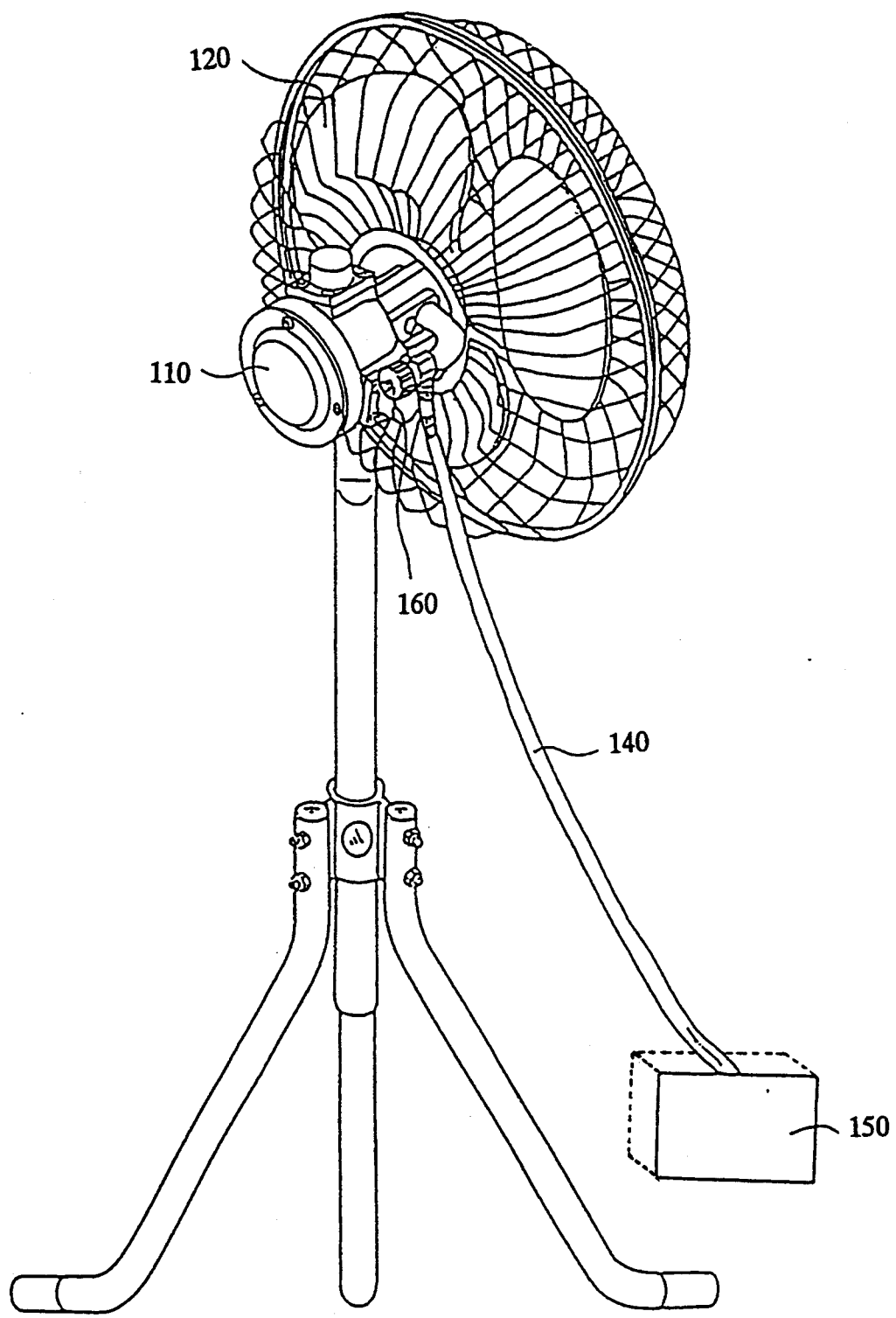
FIG. 5 shows a perspective view of the pneumatic fan in action, according to the present invention.
Figure 6:
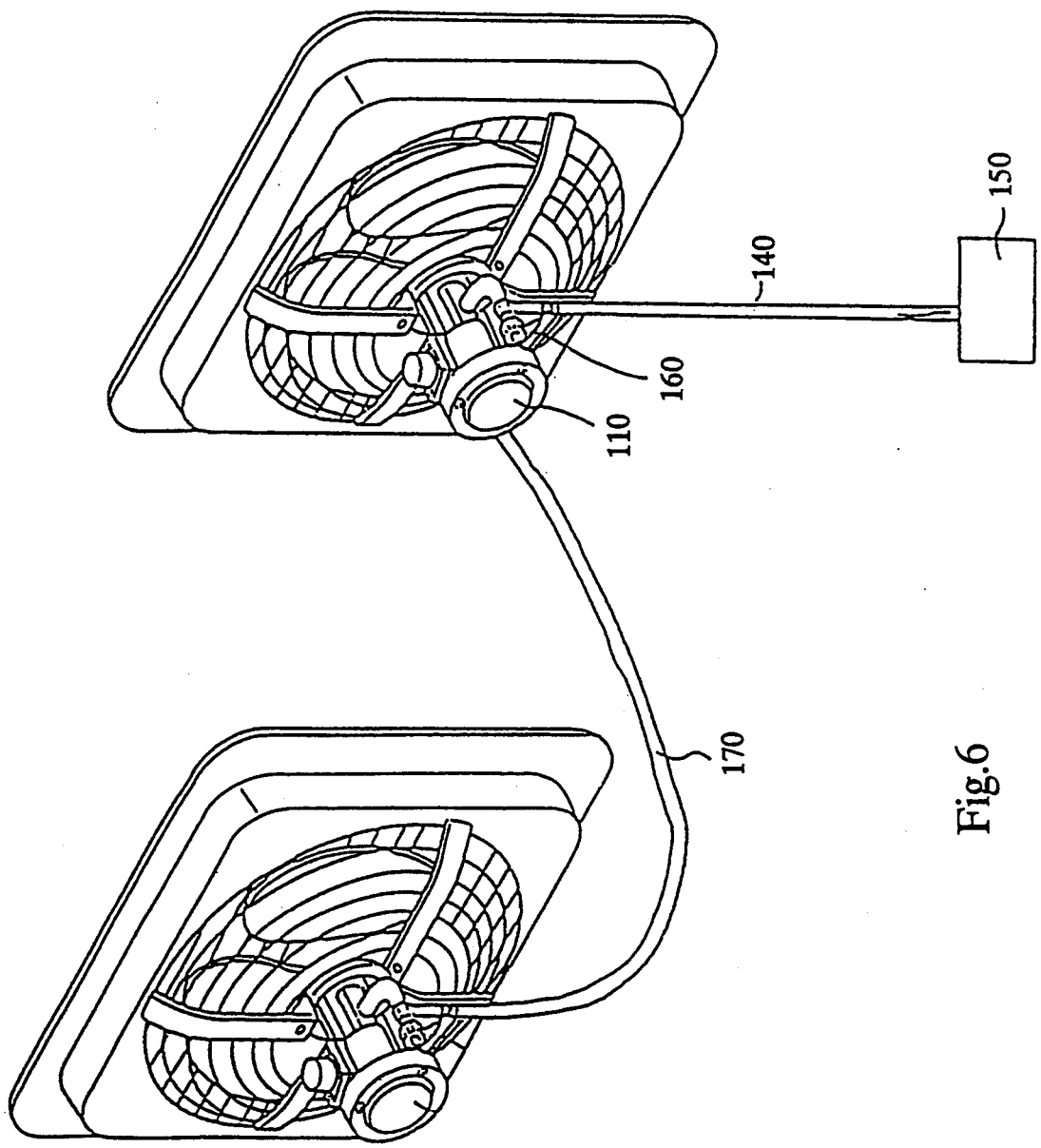
FIG. 6 shows a perspective view of a pneumatic fan of another embodiment of the present invention.

Referring to FIGS. 1, 4, and 5, a pneumatic fan of the present invention is shown to comprise a pneumatic motor 110 mounted behind a plurality of fan blades 120 and an air transporting pipe 140 located between the pneumatic motor 110 and an air compressor 150 for transporting the compressed air to the pneumatic motor 110 from the air compressor 150.

Figure 2:
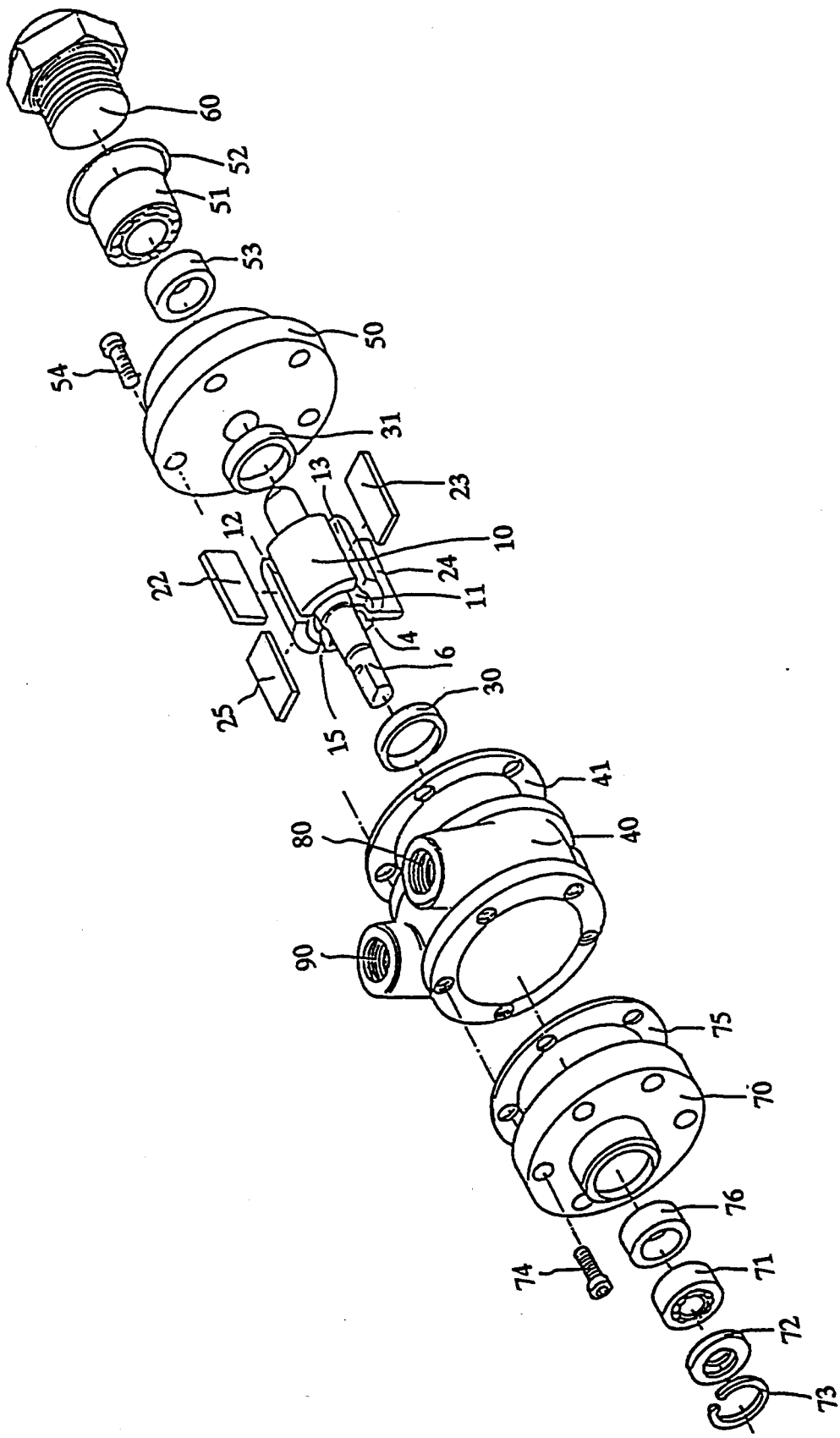
FIG. 2 shows an exploded view of a pneumatic motor of the pneumatic fan of the present invention.
Figure 3:
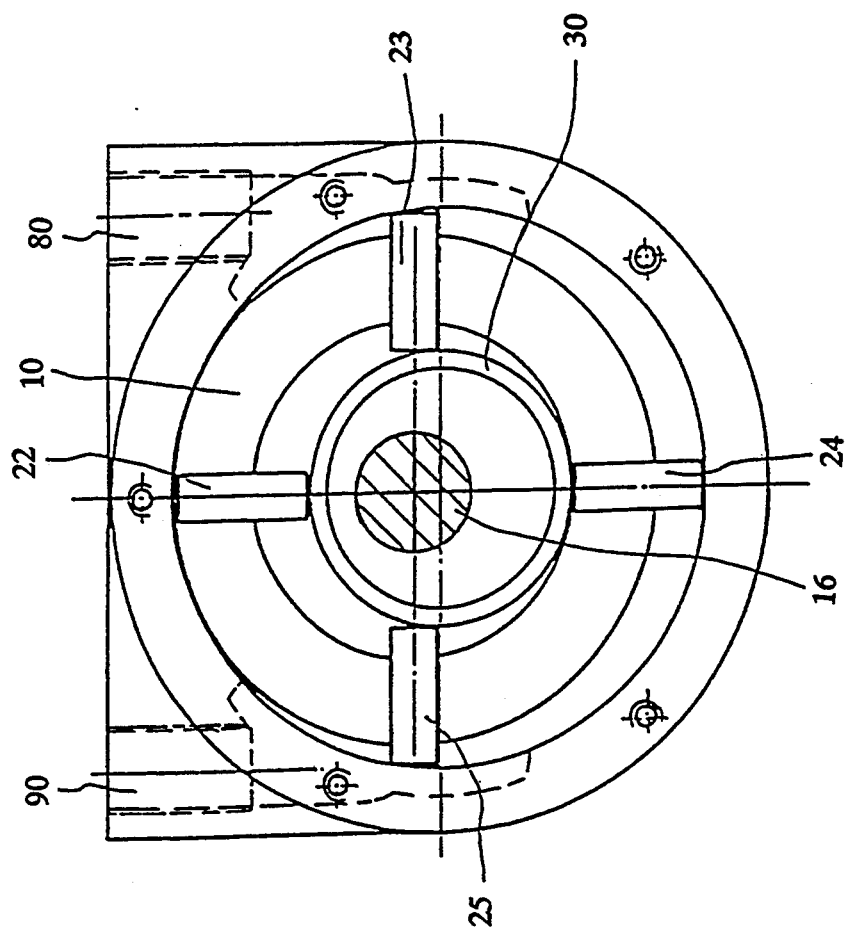
FIG. 3 shows a sectional view of the pneumatic motor of the pneumatic fan of the present invention.

As shown in FIG. 2, the pneumatic motor of the pneumatic fan of the present invention is provided with a revolving wheel 10 having stepped fillets 11 located at both ends thereof. Located in the circumference of the revolving wheel 10 are a plurality of slots 12, 13, 14, and 15, each of which has a depth slightly greater than a height of each of the motor impellers 22, 23, 24 and 25. The sum of the outer diameters of the collars 30 and 31 and the heights of the motor impellers 22 and 24 is equal to the inner diameter of the motor seat 40. The collar 31 is fitted over a rotary main shaft 16 so as to fit into a stepped fillet located at another end of the revolving wheel. The shaft bearing seat 50 is provided therein with an oil seal 53 and is mounted on a shaft bearing 51. One end of the rotary main shaft 16 is fitted into the collar 31, which is in turn fitted into the shaft bearing seat 50 so as to cause the revolving wheel 10 to make contact with the shaft bearing seat 50, with which has another end provided with a washer 52 and fastened to a large bolt 60, so as to confine the shaft bearing 51 in the shaft bearing seat 50. The collar 30 is fitted over the rotary main shaft 16 and is then mounted in the stepped fillet 11. The motor impellers 22, 23, 24 and 25 are inserted respectively into the corresponding slots 12, 13, 14 and 15 such that the motor impellers urge the collars 30 and 31. The motor seat 40 is mounted on the revolving wheel 10 in such a manner that the motor seat 40 is eccentric in relation to the revolving wheel 10. The motor seat 40 is then fastened to the shaft bearing seat 50 by means of a washer 41 and a screw 54. Similarly, the shaft bearing seat 70 is first provided with an oil seal 76 before being mounted on a shaft bearing 71. The shaft bearing 71 is retained securely in the shaft bearing seat 70 by means of a stopping ring 72 and a C-shaped clamp 73. The shaft bearing seat 70 is then fitted over the rotary main shaft 16 before being fastened to the motor seat 40 by means of a washer 75 and a screw 74. The assembly of the pneumatic motor of the present invention is therefore completed. As shown in FIG. 3, the sum of the thickness of the collar 30 and the heights of the impellers 22 and 24 is equal to the inner diameter of the motor seat 40. As a result, each of the impellers 22, 23, 24 and 25, which are all confined to the motor seat 40, urges the collar 30 which rotates at the same speed as the revolving wheel 10. When the eccentric position of the impeller is changed, the extent of the impeller that extends out of the slot is changed accordingly. For example, when the impeller 22 is located at the top point, the impeller 22 does not extend out of the slot. In the meantime, the extent that the impeller 24 extends out of the slot is at a maximum. When the high pressure gas is introduced via an air inlet 80 into the revolving wheel 10 to cause the impeller 23 to turn, the eccentric contact point between the impeller 25 and the motor seat 40 is therefore caused to change, thereby resulting in limiting the extent that the impeller 25 extends out of the slot. As a result, the impeller 25 urges the collar 30. The movement of the collar 30 brings about an increase in the extent that the impeller 23 extends out of the slot. Similarly, the movement of the collar 30 results in a change in the extent that the impellers 22 and 24 extend out of the slot so as to maintain an intimate contact with the motor seat 40. In the meantime, the alternate impellers form a sealed chamber so as to enable the revolving wheel 10 to operate efficiently. The impeller 22 continues driving the revolving wheel 10 to rotate at the time when the impeller 22 is at a position where the air inlet 80 is located. When the impeller 23 turns to be at a position where the air outlet 90 is located, the exhaust air is let out via the air outlet 90. However, the air inlet 80 may be shifted to work as an air outlet while the air outlet 90 is shifted to act as an air inlet. Such functional conversions of the air inlet 80 and the air outlet 90 are achieved by means of a forward and backward steering device. The air that has entered the revolving wheel 10 via the air inlet 80 is prevented from making contact with the shaft bearings 51 and 71 by means of the oil seals 53 and 76. As a result, the pneumatic motor is capable of operating at a high speed to drive the fan blades 120 without causing an excessive mechanical friction of the balls and a reduction in the lubricating effect of the grease.

Located by the pneumatic motor 110 is a control device 160 for adjusting the air velocity. The adjustment of the speed of the air current so generated by the fan blades 120 is accomplished by tightening or loosening the control device 160. The fan blades 120 are capable of operating to generate the air current of various speeds in a stepless manner. As shown in FIG. 1, a silencer 130 is disposed by the pneumatic motor 110 for reducing the noise generated by the rotating fan blades 120. The exhaust air is transferred via the air transporting pipe 170 to a pneumatic motor of another pneumatic fan in which the exhaust air works to power the pneumatic motor. Therefore, the exhaust air is used to power a series of pneumatic fans. Moreover, the pneumatic motor 110 of the present invention can be disposed in a wall fan, which can be therefore driven by the compressed air made available to the pneumatic motor 110 from the compressor 150 via the air transporting pipe 140.

The pneumatic fan of the present invention described above is operated without the use of electricity and is therefore safe to operate at any locality even at a high-risk area of the factory floor.

The embodiments of the present invention described above are to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A pneumatic fan comprising
    a pneumatic motor, an air transporting means, and an air compressor,
    wherein said pneumatic motor has a motor seat and a revolving wheel with a rotary main shaft, said rotary main shaft being provided respectively at both ends thereof with a stepped fillet into which a collar is fitted;
    said revolving wheel having a plurality of slots, in each of which an impeller is movably disposed such that said impeller can extend out of one of said slots to urge said collar so as to cause another impeller opposite said impeller to change the length thereof extending out of another one of said slots as a result of an eccentric relationship by which said pneumatic motor is disposed within said motor seat, and close contacts respectively, therebetween; and
    said pneumatic motor is in communication with said air compressor via said air transporting means;
    said rotary fan further comprising a plurality of fan blades affixed to said rotary main shaft so as to function as a fan when said rotatory main shaft rotates as a result of a compressed air passing through said motor seat.

2. A pneumatic fan comprising:

a revolving wheel having first and second ends and a circumference, first and second stepped fillets at said first and second ends of said revolving wheel, respectively, a plurality of axially extending slots in said circumference, and a rotary main shaft extending from said stepped fillets at both said first and second ends thereof;

a plurality of impellers matching said plurality of axially extending slots and being slidably received therein, each of said axially extending slots having a depth greater than a height of each of said impellers;

a first shaft bearing seat adapted to receive said rotary main shaft, said first shaft bearing seat being mounted to a first shaft bearing;

a second shaft bearing seat also adapted to receive said rotary main shaft, said second shaft bearing seat being mounted to a second shaft bearing;

a cylindrical motor seat having an entrance port and an exit port for receiving and exiting air, respectively, said motor seat being adapted to enclose said revolving wheel and said impellers, said motor seat being disposed such that said motor seat is eccentric relative to said revolving wheel, said motor seat and said revolving wheel being disposed eccentrically from a point of contact and each of said impellers is perpendicular to an inner cylindrical wall of said motor seat, said motor seat being fastened to said first shaft bearing seat at one end and a second shaft bearing seat at the other end, and said entrance exit ports being parallel to each other and disposed equidistantly from and at opposite sides of said point of contact;

a first collar and a second collar adapted to be fit over said first and second stepped fillets, respectively, wherein said first and second fillets are structured such that said first and second collars are disposed eccentrically relative to said revolving wheel, and each of said first and second collars is dimensioned such that the sum of its outside radius and said height of said impeller equalling a radius of said motor seat; and a plurality of fan blades affixed to said rotary main shaft so as to function as a fan when said rotatory main shaft rotates as a result of a compressed air passing through said motor seat via said inlet port and said exit port.

* * * * *